SATURABLE TRANSFORMER ENCODER

Filed Jan. 31, 1961 2 Sheets-Sheet 1

INVENTOR.
GEORGE F. MARETTE
B. I. PARSEGYAN
ABRAHAM FRANCK
BY Marvin Reich
AGENT.

INVENTOR.
GEORGE F. MARETTE
B. I. PARSEGYAN
ABRAHAM FRANCK
BY
AGENT.

United States Patent Office 3,140,478
Patented July 7, 1964

3,140,478

SATURABLE TRANSFORMER ENCODER

George F. Marette, Richfield, Berc I. Parsegyan, St. Paul, and Abraham Franck, Richfield, Minn., assignors, by mesne assignments, to the United States of America, as represented by the Secretary of the Navy Filed Jan. 31, 1961, Ser. No. 86,270
2 Claims. (Cl. 340—345)

This invention relates to magnetic devices and more particularly to a method and apparatus for generating and propagating a series of logical pulses by the use of magnetic film elements.

Many arrangements have been developed in the prior art for the generation and encoding of pulses for logical systems by the use of tubes and transistors. Many of the prior art devices require a great number of components, as well as having restrictions as to the speed of their operation. A faster device has been sought by the prior art without success.

Magnetic film elements can be made to occupy a small amount of space with a minimum of associated circuitry. This enables the user to cut costs, weight and power requirements while achieving the desired results. An improved and novel encoder is found to result from the use of thin magnetic film elements.

An object of the invention is to provide an encoder which comprises the use of components which occupy a small area.

Another object of this invention is to provide a pulse generator capable of producing rapid pulses on multiple lines in any desirable predetermined order.

Other objects and many of the attendant advantages of this invention will be readily appreciated as the same becomes better understood by reference to the following detailed description when considered in connection with the accompanying drawings wherein.

Generally, the invention contemplates the use of a plurality of magnetic films, with each film having a plurality of windings or wires to control the magnetic states of the films. By controlling the states of the individual films, one can generate a series of pulses on each of the film output wires, and thereby create a logical code or pulse group as desired. It is understood that two films are shown for the purpose of illustration but three or more films might be used if desired.

Figure 1:
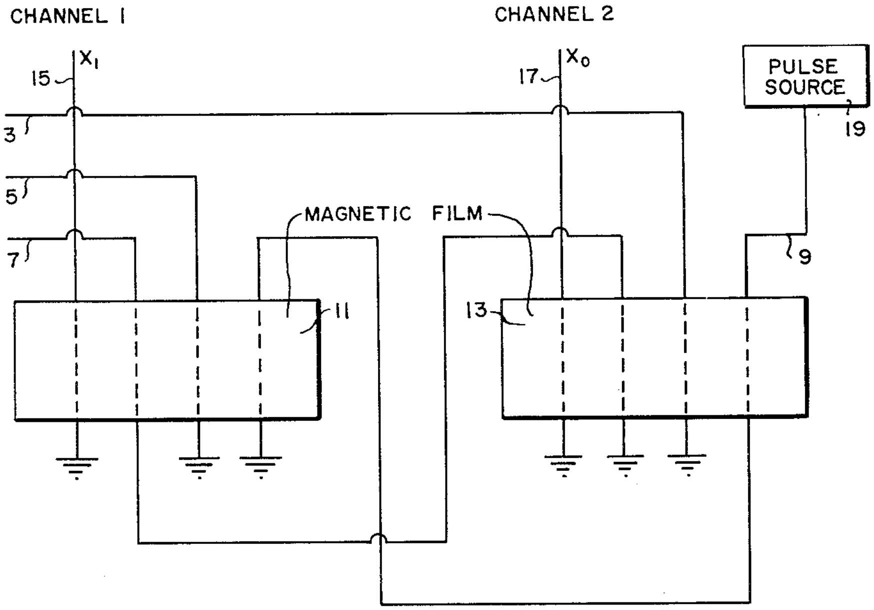
FIG. 1 is a schematic view of two films connected together to form a pulse encoder illustrating a preferred embodiment of the invention.

The description of the novel magnetic film device will be described with reference to FIG. 1 wherein the schematic representation of magnetic films 11 and 13 are shown. Film 11 has across it an output wire 15 which feeds channel 1 and film 13 has across it an output wire 17 which feeds channel 2. Input wires 5 and 7 are the control windings for film 11 and input wires 3 and 7 are the control windings for film 13. Driver wire 9 has a conventional pulse source 19 connected to it for feeding pulses to the films. The pulse source may be of the type that produces regularly spaced pulses or pulses which have different time spaces. The input and output wires run across the film as shown in FIG. 1 and may lie on the top or the bottom of the film and are preferentially perpendicular to the long dimension of the film.

Figure 2:
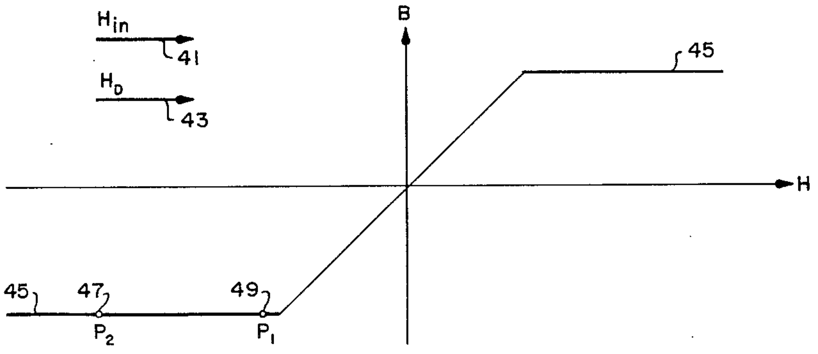
FIG. 2 illustrates the operation of the magnetic films of FIG. 1.
Figure 3:
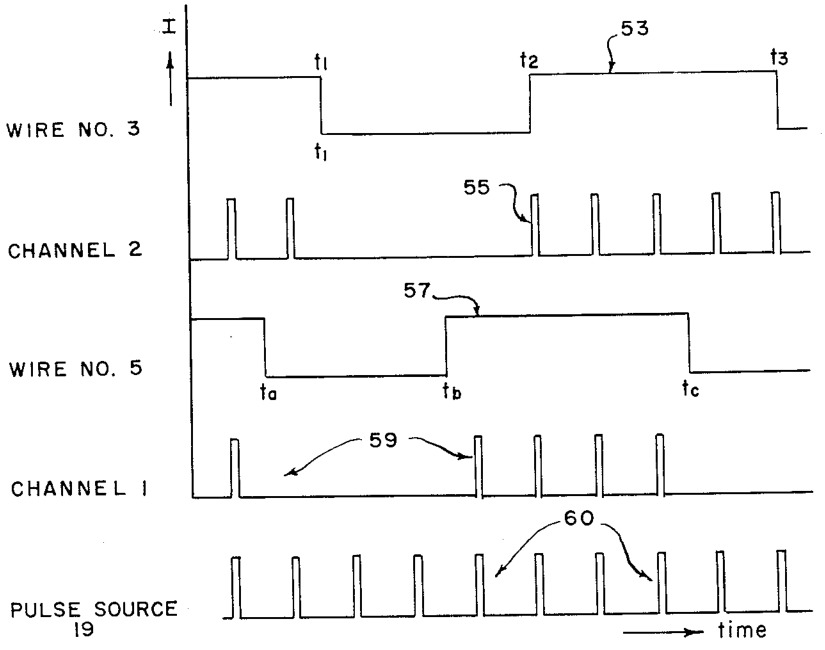
FIG. 3 illustrates one of the many code sequences which is obtainable by the use of the circuit of FIG. 1.

The operation of the circuit in FIG. 1 will be discussed in combination with the graphs of FIGS. 2 and 3. Normally in the absence of bias current on wires 3, 5 and 7, films 11 and 13 are biased at point $P_2$, labeled 47 on line 45. If a bias source should be applied to winding 3 or winding 7, film 13 will be shifted from state $P_2$, point 47, to state $P_1$, point 49 on the line 45. Similarly, if a bias source should be applied to windings 5 or 7, film 11 will be shifted from state $P_2$, point 47, to state $P_1$, point 49 on the line 45. $H_{in}$ 41 is the direction of the magnetic force created in the films by the application of the bias current to the wires 3, 5 and 7. $H_d$ 43 is the direction of the magnetic force created in the films by the application of driver pulses from pulse source 19 to wire 9. B is the flux density of the film. When the films are in the $P_2$ state, a driver pulse from pulse source 19 will not pass to the output channels, but the pulses will pass to the output channels when the films are in the $P_1$ state. Applying a bias to the films shifts them to the $P_1$ state and permits the pulses to appear on the output windings 15 and 17 to feed channels 1 and 2. The pulse duration is in the order of 50 millimicro seconds so that very rapid operation is obtained. The duration between pulses may also be in the order of 50 millimicro seconds or longer if desired.

Therefore, by applying pulses to wire 9 and biasing only wire 3 an output in channel 2 is obtained. Similarly, by applying pulses to wire 9 and biasing only wire 5 output pulses will appear in channel 1. If wire 7 has the bias placed on it, output pulses will appear in both channel 1 and channel 2. By controlling the time duration of the bias sources, the order and sequence of pulses being produced in channels 1 and 2 are controlled. In this manner any desired code sequence can be created. For example, in FIG. 3 a bias is placed on wire 3 for a time $t_1$ and for a time $(t_3-t_2)$ during which channel 2 will have a corresponding output of pulses 55. Similarly a bias is placed on wire 5 for times $t_a$ and $(t_c-t_b)$ during which channel 1 will have an output of pulses 59. The output on channels 1 and 2 would be the desired code in this example. Pulses 60 are the output of pulse source 19.

Obviously many modifications and variations of the present invention are possible in the light of the above teachings. It is therefore to be understood that within the scope of the appended claims the invention may be practiced otherwise than as specifically described.

What is claimed is:

1. A device for encoding of pulses which are of very short duration comprising, a source of driver pulses, a pair of magnetic thin film units each unit having a plurality of control means for setting the film in a predetermined state at a predetermined time, said plurality of control means comprising a plurality of wires lying perpendicular to the film and on top of the film, means coupling the pulses to said pair of magnetic film elements, each magnetic film having an output wire, two control wires and a driving wire coupled to the film in a parallel relationship whereby a predetermined code of pulses is generated by said magnetic elements in response to said source of driver pulses.

2. A device for encoding of pulses which are of very short duration comprising, a source of driver pulses, a plurality of magnetic thin film units each unit having a plurality of control means for setting the film in a predetermined state at a predetermined time, said plurality of control means comprising a plurality of wires lying perpendicular to the film and on top of the film, means coupling pulses to said plurality of magnetic film elements, each magnetic film having an output wire, two control wires and a driving wire coupled to the film in a parallel relationship whereby a predetermined code of pulses is generated by said magnetic elements in response to said source of driver pulses.

References Cited in the file of this patent

UNITED STATES PATENTS 3,070,783 Pohm ---------------- Dec. 25, 1962
3,077,586 Ford ------------------ Feb. 12, 1963

FOREIGN PATENTS 845,604 Great Britain ----------- Nov. 18, 1957